United States Patent [19]
Zamanian et al.

[11] Patent Number: 6,014,670
[45] Date of Patent: Jan. 11, 2000

[54] APPARATUS AND METHOD FOR PERFORMING DATA TRANSFORMATIONS IN DATA WAREHOUSING

[75] Inventors: M S Kiumarse Zamanian; Diaz Nesamoney, both of San Francisco, Calif.

[73] Assignee: Informatica Corporation, Menlo Park, Calif.

[21] Appl. No.: 08/966,449

[22] Filed: Nov. 7, 1997

[51] Int. Cl.[7] .................................................. G06F 17/30
[52] U.S. Cl. .......................................... 707/101; 707/100
[58] Field of Search .................................. 707/101, 201, 707/3, 4, 7, 100

[56] References Cited

U.S. PATENT DOCUMENTS

| | | | |
|---|---|---|---|
| 5,692,181 | 11/1997 | Anand et al. | 707/102 |
| 5,706,495 | 1/1998 | Chadha et al. | 707/2 |
| 5,708,828 | 1/1998 | Coleman | 707/523 |
| 5,721,903 | 2/1998 | Anand et al. | 707/5 |
| 5,781,911 | 7/1998 | Young et al. | 707/201 |
| 5,794,228 | 8/1998 | French et al. | 707/2 |
| 5,794,229 | 8/1998 | French et al. | 707/2 |
| 5,794,246 | 8/1998 | Sankaran et al. | 707/101 |
| 5,826,258 | 10/1998 | Gupta et al. | 707/4 |
| 5,832,496 | 11/1998 | Anand et al. | 707/102 |
| 5,842,213 | 11/1998 | Odom et al. | 707/100 |
| 5,870,746 | 2/1999 | Knutson et al. | 707/101 |
| 5,870,747 | 2/1999 | Sundaresan | 707/101 |
| 5,873,102 | 2/1999 | Bridge, Jr. et al. | 707/204 |

OTHER PUBLICATIONS

White, Colin. "Data Warehousing: Cleaning and Transforming Data." *InforDB* vol. 10 No. 6. Apr. 1997. Database Associates INT, USA. pp. 11–12. XP–002091743.

White, Colin. "Managing Data Transformations." *Byte* (International Edition) vol. 22, No. 12. Dec. 1997. McGraw–Hill, USA. pp. 53–54. XP002091744.

Squire, Cass. "Data Extraction and Transformation for the Data Warehouse." 1995 ACM Sigmod International Conference on Management of Data, San Jose, CA, USA, May 22–25, 1995. pp. 446–447. XP0092091745.

*Primary Examiner*—Paul V. Kulik
*Assistant Examiner*—Sanjiv Shah
*Attorney, Agent, or Firm*—Wagner, Murabito & Hao LLP

[57] ABSTRACT

A transformation description language (TDL) for specifying how data is to be manipulated in a data warehousing application. The TDL is comprised of a source for storing raw data, one or more transformation objects for processing the raw data according to predefined instructions, and a target for storing the processed data. A mapping is used for directing the data flow between the I/O ports corresponding to the source, the plurality of transformation objects, and the target. The mapping specifies the connectivity between the source, transformation, and target objects as well as the order of these connections. There are a number of different transformations which can be performed to manipulate the data. Some such transformations include: an aggregator transformation, an expression transformation, a filter transformation, a lookup transformation, a query transformation, a sequence transformation, a stored procedure transformation, and an update strategy transformation.

51 Claims, 10 Drawing Sheets

APPARATUS AND METHOD FOR PERFORMING DATA TRANSFORMATIONS IN DATA WAREHOUSING

FIELD OF THE INVENTION

The present invention relates to database systems. More particularly, the present invention pertains to an apparatus and method for transforming data in data warehousing applications.

BACKGROUND OF THE INVENTION

Due to the increased amounts of data being stored and processed today, operational databases are constructed, categorized, and formatted in a manner conducive for maximum throughput, access time, and storage capacity. Unfortunately, the raw data found in these operational databases often exist as rows and columns of numbers and code which appears bewildering and incomprehensible to business analysts and decision makers. Furthermore, the scope and vastness of the raw data stored in modern databases renders it harder to analyze. Hence, applications were developed in an effort to help interpret, analyze, and compile the data so that it may be readily and easily understood by a business analyst. This is accomplished by mapping, sorting, and summarizing the raw data before it is presented for display. Thereby, individuals can now interpret the data and make key decisions based thereon.

Extracting raw data from one or more operational databases and transforming it into useful information is the function of data "warehouses" and data "marts." In data warehouses and data marts, the data is structured to satisfy decision support roles rather than operational needs. Before the data is loaded into the data warehouse or data mart, the corresponding source data from an operational database is filtered to remove extraneous and erroneous records; cryptic and conflicting codes are resolved; raw data is translated into something more meaningful; and summary data that is useful for decision support, trend analysis or other end-user needs is pre-calculated. In the end, the data warehouse is comprised of an analytical database containing data useful for decision support. A data mart is similar to a data warehouse, except that it contains a subset of corporate data for a single aspect of business, such as finance, sales, inventory, or human resources. With data warehouses and data marts, useful information is retained at the disposal of the decision makers.

One major difficulty associated with implementing data warehouses and data marts relates to that of data transformation. A data transformation basically includes a sequence of operations that transform a set of input data into a set of output data. As a simple example, the total sum of revenues of all of the divisions of a company minus its operating costs and losses will result in the profit for that company. In this example, revenue for each division, company operating costs, and company losses are input data and the company profit is the output data, while the transformation is basically comprised of simple arithmetic operations. This example could become much more complex for a large company that offers numerous products and services in various regions and international markets. In such a case, the transformation is no longer a simple arithmetic formula, but becomes a complex network of data transformations (e.g., SQL-Structured Query Language expressions, arithmetic operations, and procedural functions) that define the process for how the input data from various sources flow into the desired results in one or more target databases.

Presently, the existing approaches for handling transformations for data warehousing applications can be classified into three categories: using procedural programming languages (e.g., C, C++, and COBOL); using SQL expressions; or a combination of these two. Any of these three approaches, however, is primarily focused on capturing the low-level algorithmic behavior of transformations and does not by any means facilitate the definition and exchange of transformation metadata (i.e., data that describes how data is defined, organized, or processed). Furthermore, this was usually performed by a highly specialized software engineer who would design custom programs tailored to specific applications. Such programmers are relatively scarce and are in high demand. As such, even a simple task can be quite expensive. More complex data transformations are extremely costly to implement and time-consuming as well, especially given that most data transformations involve voluminous amounts of data that are viewed and interpreted differently by various analysts and decision-makers. In today's highly competitive marketplace, it is often crucial that the most recent information be made available to key individuals so that they can render informed decisions as promptly as possible.

Moreover, software vendors in the data warehousing domain often offer specialized tools for defining and storing transformation information in their products. Such tools are still geared towards algorithmic behavior of transformations and usually provide graphical user interfaces to facilitate the use of procedural languages and/or SQL for that purpose. But more significantly, the format in which such transformation information is represented and saved is system-specific and low-level such that exchanging this information with other similar software becomes extremely difficult and error-prone. Hence, data transformation software might work properly for one database, but might be incompatible with another database which contains critical data. Presently, the only high-level protocol used for describing and exchanging transformation information between different data warehousing software is limited to the definition of field-level transformations with SQL statements that include logical, arithmetic, and string operations.

Thus, there exists a strong need in the data warehousing industry for some formal mechanism for exchanging metadata as well as the need for a computer-parsable language that could concisely describe various characteristics of complex data transformation networks. The present invention offers a solution with the conception and creation of a Transformation Definition Language (TDL).

SUMMARY OF THE INVENTION

The present invention pertains to a transformation description language (TDL) used for specifying how data is to be manipulated in a data warehousing application. The TDL is comprised of one or more sources for storing raw data, one or more transformation objects for processing the raw data according to predefined instructions, and one or more targets for storing the processed data. A mapping is used for directing the data flow between the I/O ports corresponding to the sources, the plurality of transformation objects, and the targets. The mapping specifies the connectivity between the sources, transformation, and target objects as well as the order of these connections. There are a number of different transformations which can be performed to manipulate the data. Some such transformations include: an aggregator transformation, an expression transformation, a filter transformation, a lookup transformation, a query transformation, a sequence transformation, a stored procedure transformation, and an update strategy transformation.

BRIEF DESCRIPTION OF THE DRAWINGS

The operation of this invention can be best visualized by reference to the following drawings described below.

DETAILED DESCRIPTION

An apparatus and method for transforming data in data warehousing applications is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. Furthermore, the use of the term data mart hereinafter includes data warehousing and other related database structures and organizations.

Figure 1:
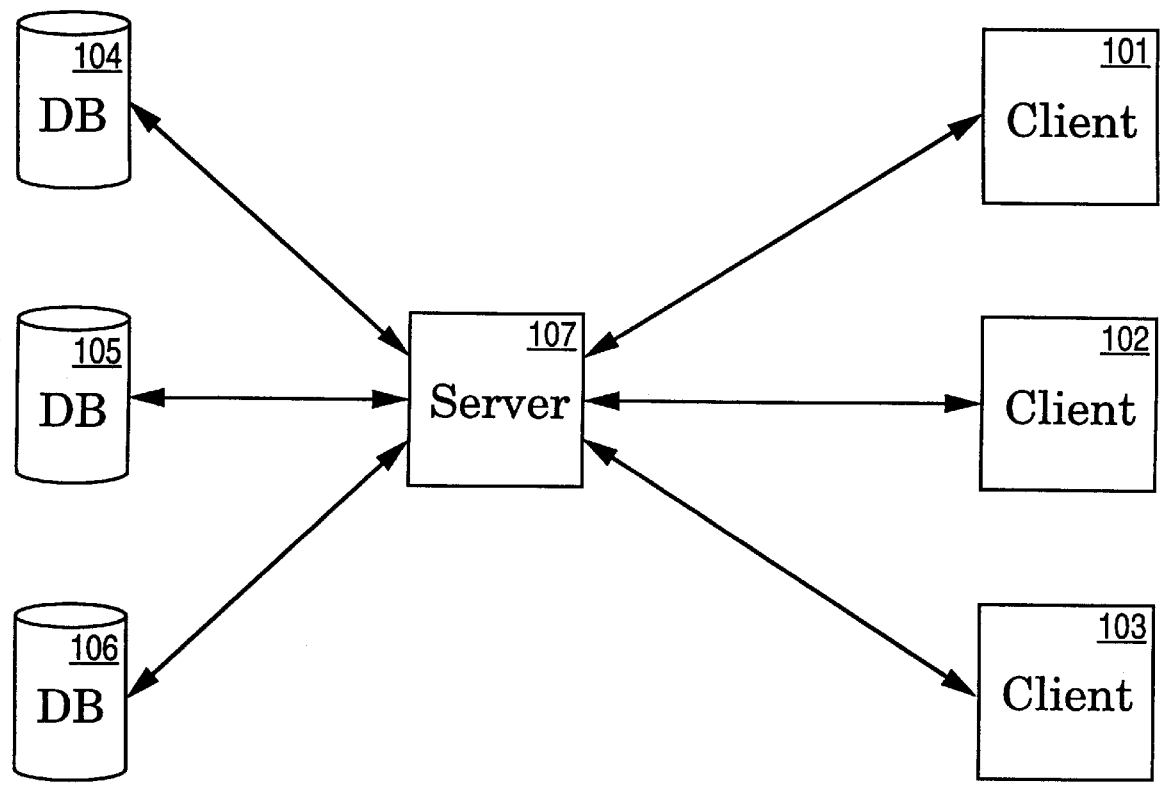
FIG. 1 is a block diagram of a client/server system upon which the present invention may be practiced.

FIG. 1 is a block diagram of a client/server system upon which the present invention may be practiced. The system may incorporate a number of clients 101–103 (e.g., personal computers, workstations, portable computers, minicomputers, terminals, etc.), upon which various client processes are used to perform desired tasks (e.g., inventory, payroll, billing, finances, etc.). The data relating to these various tasks can be entered, updated, and retrieved by any one of the clients 101–103 through one or more servers 107. Server 107 is comprised of a computer running a shared database management system (DBMS). A DBMS is a piece of software that manages access to a database. Basically, a database is a collection of related files containing data. The data is stored in one or more operational databases (DB) 104–106 (e.g., any of the conventional relational database management systems from Oracle, Informix, Sybase, Microsoft, etc.) residing within one or more high capacity mass storage devices (e.g., hard disk drives, optical drives, tape drives, etc.) A DBMS "mounts" a particular database in order to access tables of information contained within the files associated with that database. Thereby, data stored in the form of tables in a relational database residing in the databases 104–106 are accessible to any of the clients 101–103 via server 107. Different servers running different instances of a DBMS, can simultaneously access the same database. It would be appreciated by those with ordinary skill in the art that the present invention may be practiced in any number of different hardware configurations.

A client 101 is used to create a repository 103, which is used to keep track of session information as well as mapping information relating to how data is to be mapped and transformed from sources of the operational databases 102 to target tables of data marts or data warehouses 106. The target databases of data marts 106 are synchronized with changes made to the operational databases 102.

Figure 2:
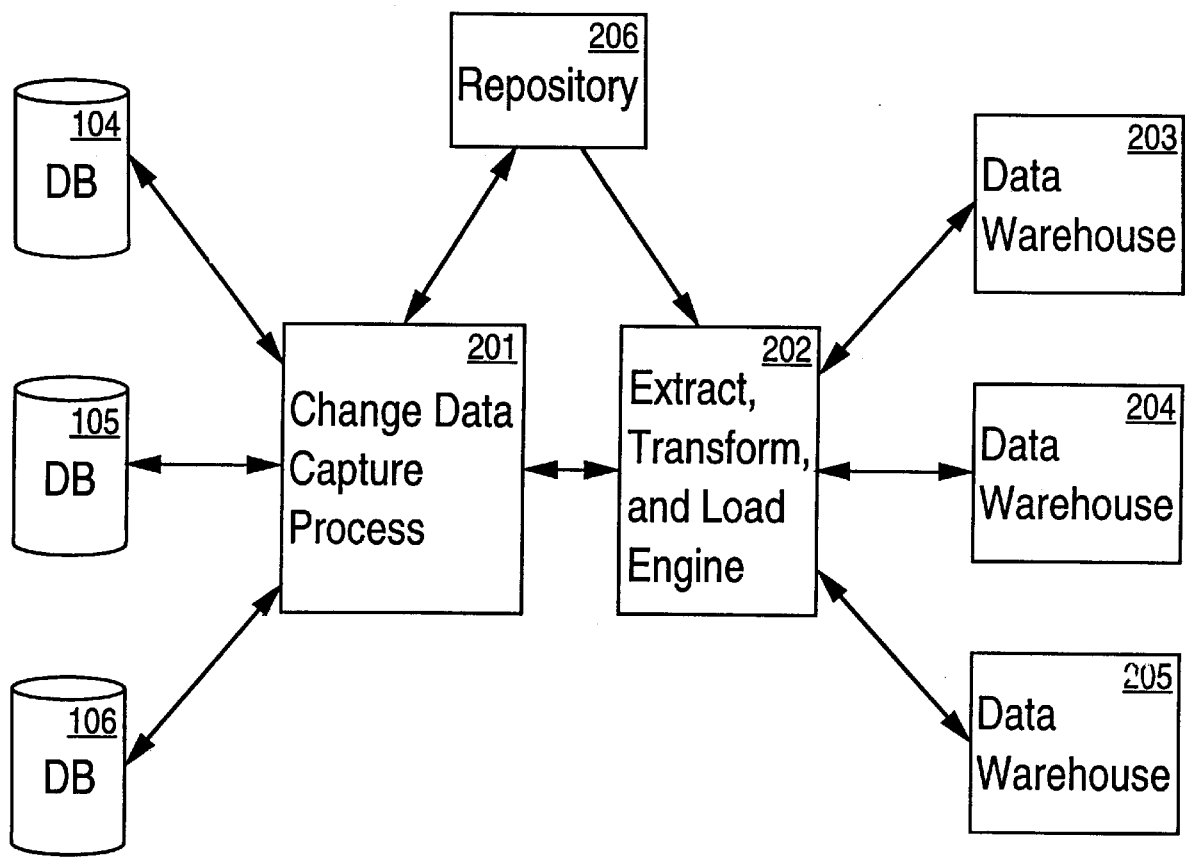
FIG. 2 shows the data flow of the change data capture process and the extract, transform, and load process used to create data warehouses.

FIG. 2 shows the data flow of the change data capture process 201 and the extract, transform, and load process 202 used to create data warehouses 203–205. Raw data are stored in source tables residing within one or more source operational databases 104–106. Anytime a new entry is entered or an old entry is updated, the changes are captured and staged by the change data capture process 201. The extraction, transformation, and loading process 202 then makes the appropriate transformations and propagates the changes to the appropriate target tables of data warehouses 203–205. A repository 206 is used to store the requisite session and mapping information used by the extracting, transformation, and loading process 202; repository 206 also contains information regarding what data should be captured from the source tables of the operational databases 201–202.

In the currently preferred embodiment of the present invention, a transformation description language (TDL) process is created for completely describing the data definitions, manipulations, and other types of transformations in the data warehousing domain. The syntax and semantics of TDL are similar to the Data Definition Language (DDL) and Structured Query Language (SQL) in order to provide some degree of familiarity and simplicity for users. Yet, TDL is general and extensible enough to define commonly used transformations and their combinations. Basically, TDL consists of five primary constructs: source, target, transformation, port, and mapping. The various functions and relationships between these five constructs are shown in FIGS. 3A–E.

Figure 3A:
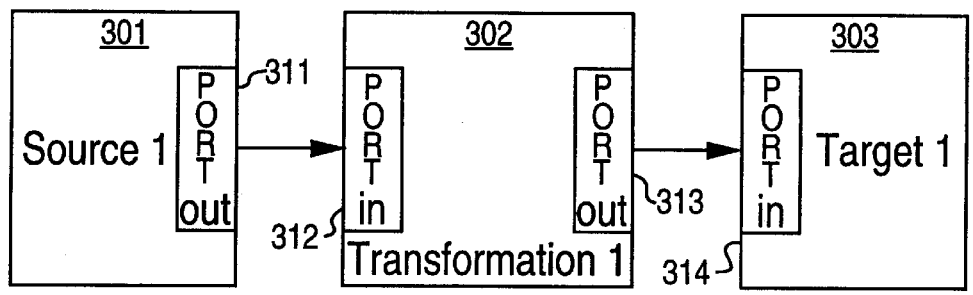
FIG. 3A shows the most basic transformation function structure.

FIG. 3A shows the most basic transformation function structure of a single source 301 coupled to one transformation object 302 which is coupled to a single target 303. The source 301 contains original, untransformed data. The entire data set or a specific partial data set is output on port 311. The source output ports 311 are mapped to the input ports 312 of transformation object 302. Transformation object 302 takes this data and manipulates it to some predefined rules or behavior and then outputs the transformed data to its output ports 313. The output ports 313 are then mapped to the input ports 314 of target 303. Target 303 stores the transformed data. Basically then, a mapping represents a network of sources, targets, transformations and specifies their relationships (e.g., inputs, outputs, and interconnections). The mapping in FIGS. 3A–E is depicted by the arrows. For example, the arrow pointing from port 311 to port 312 indicates that data flows from source 301 to transformation object 302. Ports provide the means for transferring data between sources, targets, and transformation objects. The flow of data in a mapping starts from a source and ends in a target, with one or more intermediary transformation objects to manipulate the data throughout this path.

Figure 3B:
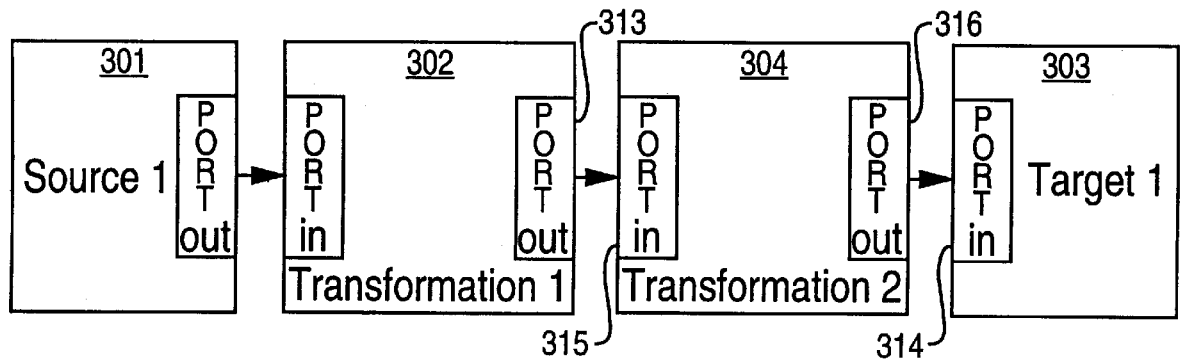
FIG. 3B shows that more than one transformation object can be coupled in series to achieve higher level transformations and functionality.

FIG. 3B shows that more than one transformation object can be coupled in series to achieve higher level transformations and functionality. A user specifies the second transformation object 304 and its specific behavior. The second transformation object 304 may be inserted into a pre-existing or new transformation data flow by mapping its input ports 315 to the output ports 313 of a previous transformation object 302 and mapping its output ports 316 to the input ports 314 of target 303. Any number of transformation objects can thusly be chained together in a serial fashion.

Figure 3C:
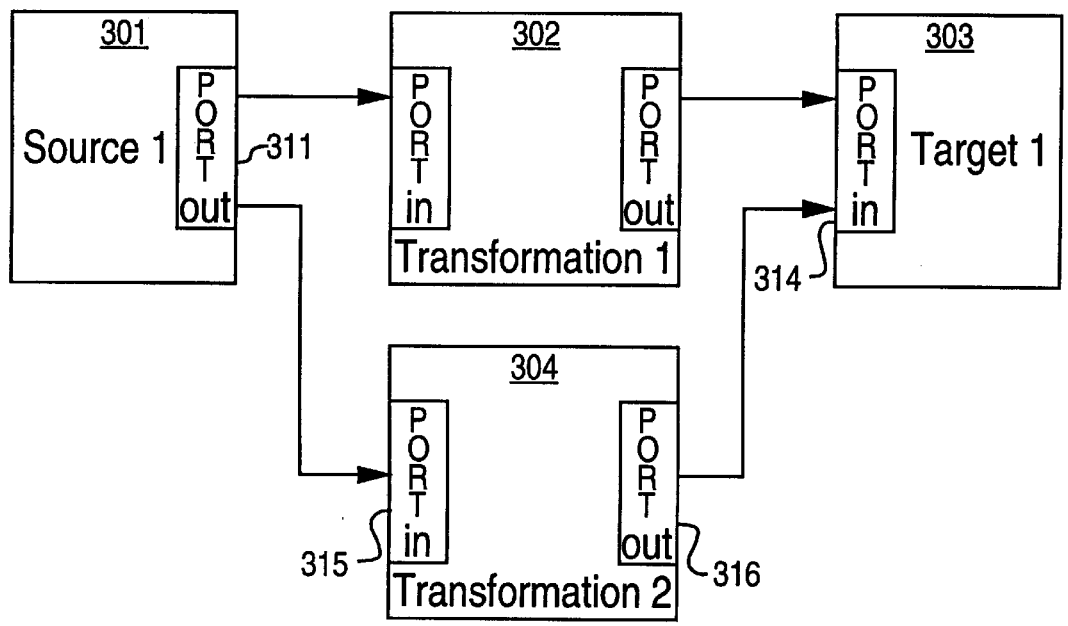
FIG. 3C shows that multiple transformation objects can be coupled in parallel.

FIG. 3C shows that multiple transformation objects can be coupled in parallel. A second transformation object 304 can be coupled in parallel to a pre-existing transformation object 302. This is accomplished by the user specifying the second transformation object 304 and its behavior. The second transformation object 304 may be inserted into a pre-existing or new transformation data flow by mapping its input ports 315 to the output ports 311 of source 301 and mapping its output ports 316 to the input ports 314 of target 303. Any number of transformation objects can thusly be chained together in a parallel fashion.

Figure 3D:
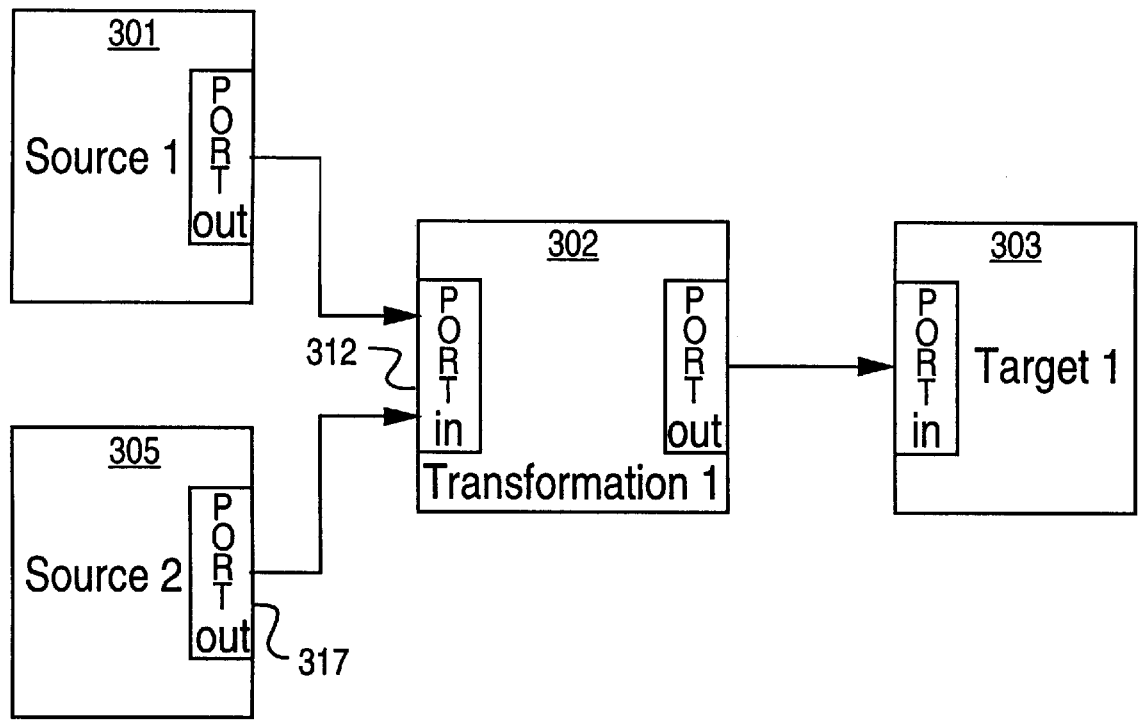
FIG. 3D shows that multiple sources can be used to supply original data to the transformation process.

FIG. 3D shows that multiple sources can be used to supply original data to the transformation process. For example, a second source 305, as specified by a user, can be incorporated by mapping its output port 317 to the input port 312 of a transformation object 302.

Figure 3E:
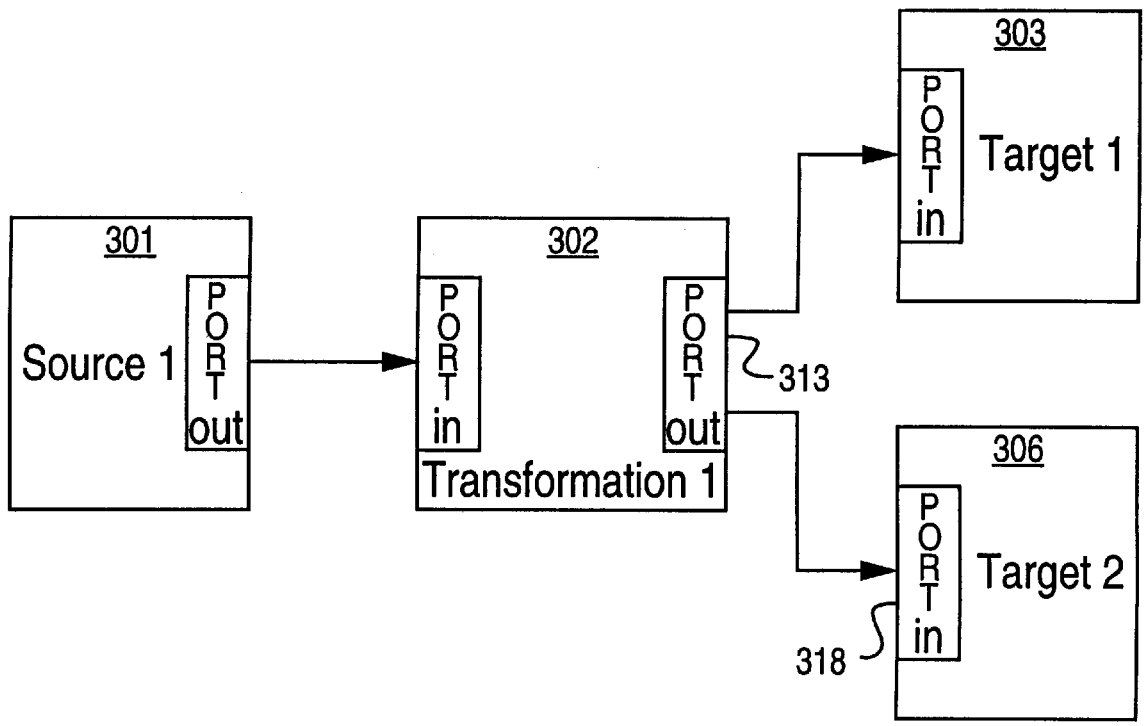
FIG. 3E shows that multiple targets can be used to store manipulated data after the transformation process has completed.

FIG. 3E shows that multiple targets can be used to store manipulated data after the transformation process has completed. For example, a second target 306, as specified by a user, can be incorporated by mapping its input ports 318 to the output ports 313 of a transformation object 302.

Figure 4:
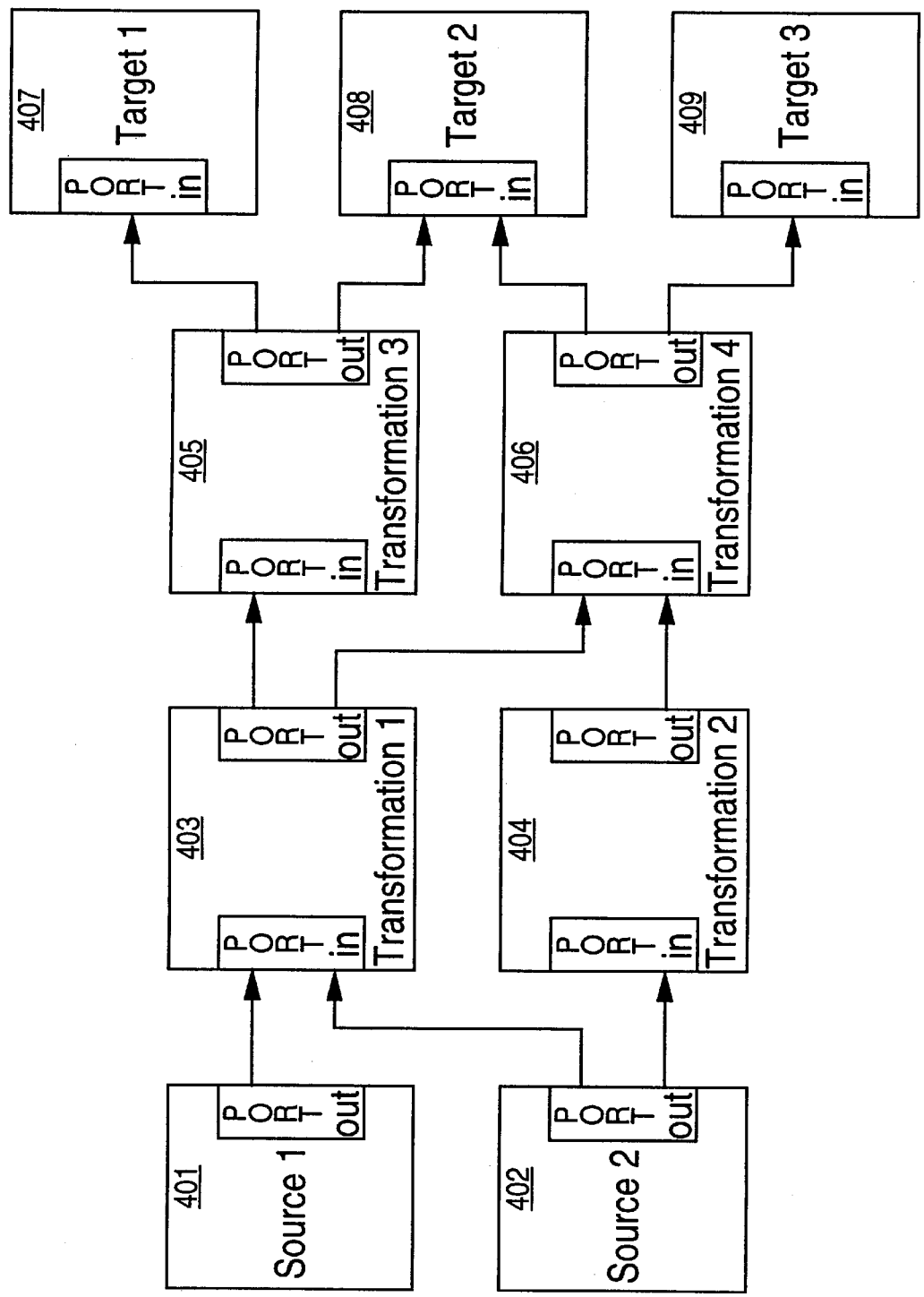
FIG. 4 shows a more complex transformation process having multiple sources, transformation objects, and targets.

FIG. 4 shows a more complex transformation process having multiple sources, transformation objects, and targets. It can be seen that there can be multiple sources 401–402, however, there must be at least one source. The same source can supply data to different transformation objects. For example, source 402 supplies data to transformation objects 403 and 404. The same set or a different set of data may be supplied to the transformation objects 403 and 404. Conversely, a transformation object may accept input data from more than one source (e.g., transformation object 403 receives input from sources 401 and 402). Similarly, a transformation object may output its transformed data to subsequent multiple transformation objects. For example, transformation object 403 outputs its transformed data to transformation objects 405 and 406. Conversely, a single transformation object can receive transformed data from several different upstream transformation objects (e.g., transformation object 406 receives as inputs, transformed data from transformation objects 403 and 404). A transformation object may output its transformed data to several different targets. For example, transformation object 405 can output its transformed data to both target 407 as well as target 408. In short, the present invention offers great versatility such that virtually any combination of source, transformation, and targets can be linked together in order to achieve the desired overall transformation process, provided, however, that there is at least one source, one transformation, and one target.

The TDL language offers a set of transformation "templates" that represent the most commonly used transformations for data warehousing applications. However, TDL can be easily extended to accommodate other transformations. Each transformation template in turn has a declaration part (e.g., what data to use) and a behavior part (e.g., how data is used). The ports, as well as any attributes (with optional default values), of a transformation are defined in its declaration part while the algorithms and expressions for manipulating the data are specified in its behavior part. The description of a mapping consists of sources, targets, and instances of transformation templates that have specific associated ports and attribute values. The order in which the transformations are defined in a mapping, in turn, dictates the flow of data between the starting sources, and the ending targets. Furthermore, TDL is designed such that a computer-based parser can be developed to effectively verify the validity of a mapping and its constituents from a syntactic as well as some well-defined semantics pertaining to data warehousing transformation rules.

Figure 5:
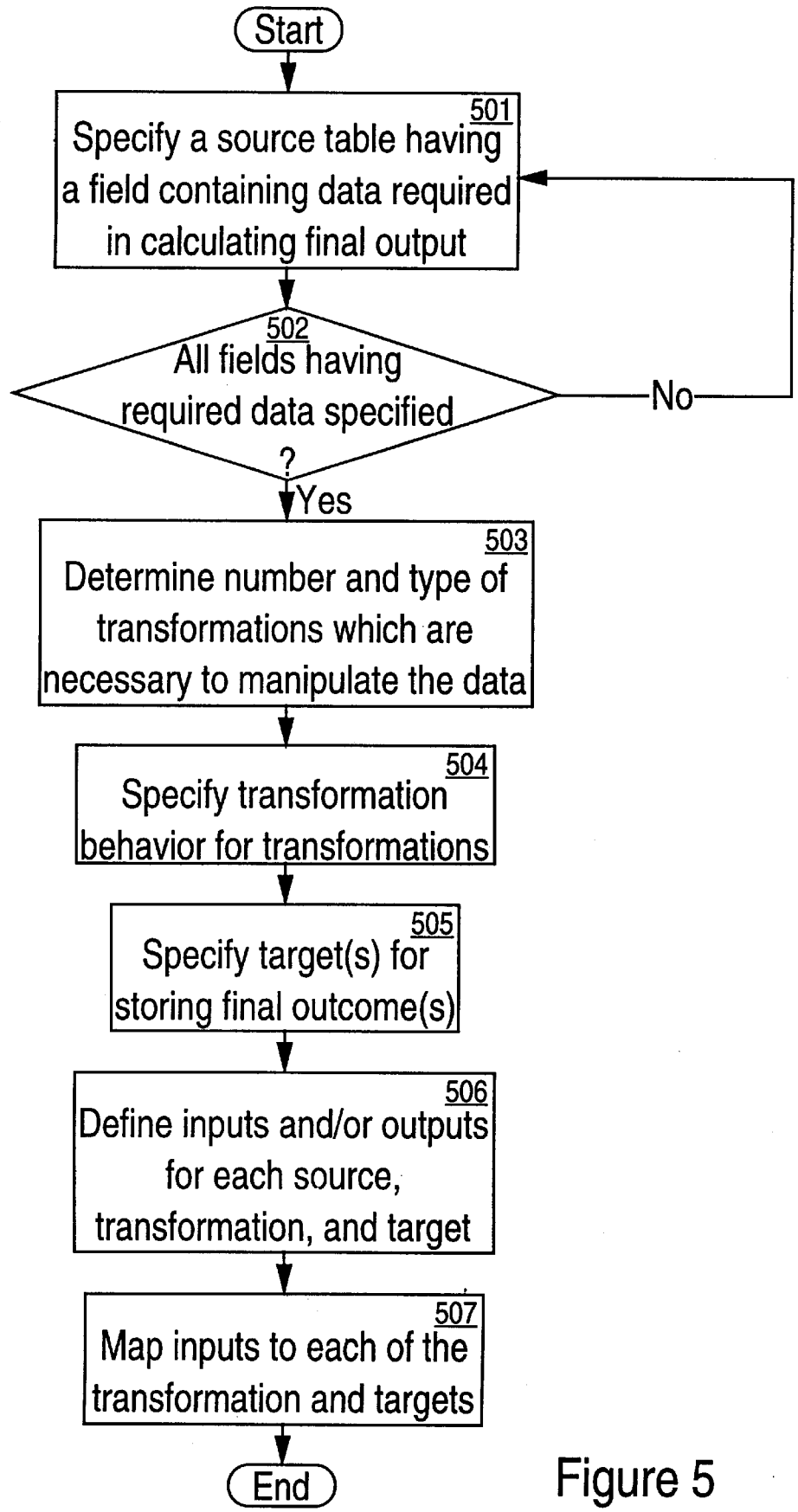
FIG. 5 is a flowchart describing the steps for performing the transformation description language (TDL) process of the present invention.

FIG. 5 is a flowchart describing the steps for performing the transformation description language (TDL) process of the present invention. Initially, a source table having a field containing raw data required in order to calculate the final desired output is specified, step 501. A determination is made in step 502 as to whether any additional source tables are required in order to access the requisite raw data. If additional source tables are required, step 501 is repeated to specify those tables. After all the source tables have been specified, a determination as to the number and types of transformations to be performed is then made in step 503. The transformation behavior of each of the transformations is then specified, step 504. The transformation behavior describes how the data being input to a particular transformation object is to be manipulated or otherwise modified. Next, one or more targets is specified in step 505, whereupon the final outputs are stored in these target tables. In step 506, the inputs and/or outputs are defined for each of the source, transformation, and target objects. A source object only has output ports; a transformation object has input and output ports; and a target object only has input ports. In the last step 507, each input port is connected to an output port, thus linking the various objects in a mapping to specify the data flow.

Figure 6:
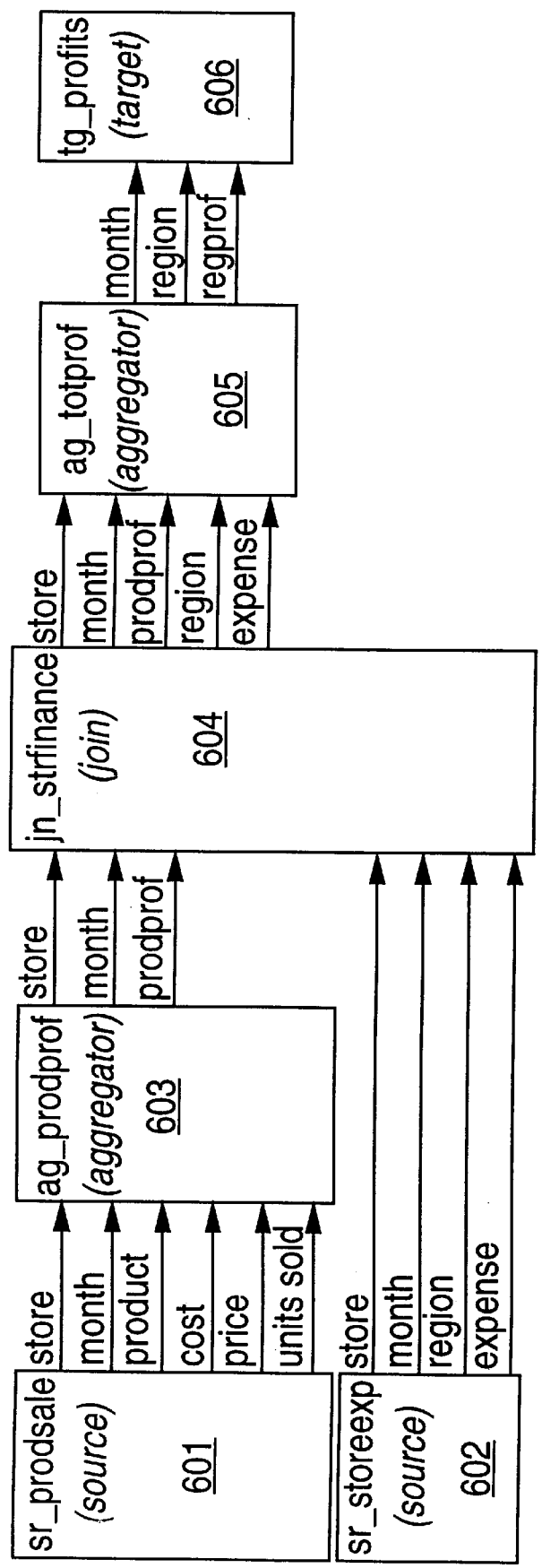
FIG. 6 shows an exemplary graphical illustration of data flow in a mapping with source, target, and transformation objects.

FIG. 6 shows an exemplary graphical illustration of data flow in a mapping with source, target, and transformation objects. Two source objects 601 and 602; three transformation objects 603–605; and one target object 606 are shown. Source object 601 contains and outputs data relating to a store identification (store), a particular month of interest (month), a specific product of interest (product), the cost of the product (cost), the price that the product is sold (price), and the number of units of that product were sold during that particular month (unitssold). The data from sr_prodsale source object 601 is input to an ag_prodprof aggregator transformation object 603. The aggregator transformation object 603 calculates the profit for the product by taking the sum of the units sold multiplied by the difference between the price and cost. It outputs the store identification (store), the month (month), and the profit for that product for that month (prodprof). This data is fed as inputs to the jn_strfinance joiner transformation object 604. Also input to the jn_strfinance transformation object 604 are data from the sr_storeexp source object 602. The sr_storeexp source object 602 contains and outputs data relating to the store identification (store), particular month of interest (month), region of interest (region), and expenses for that region (expense). The jn_strfinance joiner transformation object 604 then performs a relational join operation to these seven inputs and outputs the store of interest (store), the month of interest (month), the profit for that product for that region (prodprof), and the expenses for that region (expense). This data is input to the ag_totprof aggregator transformation object 605. It is the function of the ag_totprof aggregator transformation object 605 to calculate the regional profit (regprof) by taking the sum of the differences between the product profit (prodprof) minus the expense (expense). Lastly, the month of interest (month), the region of interest (region) and the profits for that region during that month (regprof) generated by the ag_totprof aggregator transformation object 605 is stored in the tg_profits source object 606.

The following is the TDL specification of the example described above and in reference to FIG. 6.

```
CREATE Source sr_prodsale (store VARCHAR(50) OUT,
        month VARCHAR(10) OUT,
        product VARCHAR(50) OUT,
        cost MONEY OUT,
        price MONEY OUT,
        unitssold INTEGER OUT)
{};
CREATE Source sr_storeexp (store VARCHAR(50) OUT,
        month VARCHAR(10) OUT,
        region VARCHAR(25) OUT,
        expense MONEY OUT)
{};
CREATE Aggregator ag_profprof (store VARCHAR(50) INOUT,
        month VARCHAR(10) INOUT,
        product VARCHAR(5O) IN,
        cost MONEY IN,
        price MONEY IN,
        unitssold INTEGER IN)
        prodprof MONEY OUT,
        Cachedir "S:\dw\system" ATTR).
{
   prodprof = SUM(unitssold*(price − cost));
   GROUP (store, month);
};
CREATE Join jn_strfinance (store VARCHAR(50) INOUT,
        month VARCHAR(10) INOUT,
        prodprof MONEY INOUT,
        store1 VARCHAR(50) IN,
        month1 VARCHAR(10) IN,
        region VARCHAR(25) INOUT,
        expense MONEY INOUT)
{
   store1 = store;
   month1 = month;
};
CREATE Aggregator ag_storeprof (store VARCHAR(50) IN,
        month VARCHAR(10) INOUT,
        prodprof MONEY IN,
        region VARCHAR(25) INOUT,
        expense MONEY IN,
        regprof MONEY OUT)
{
   regprof = SUM(prodprof − expense);
   GROUP (region, month);
};
```

Figure 7A:
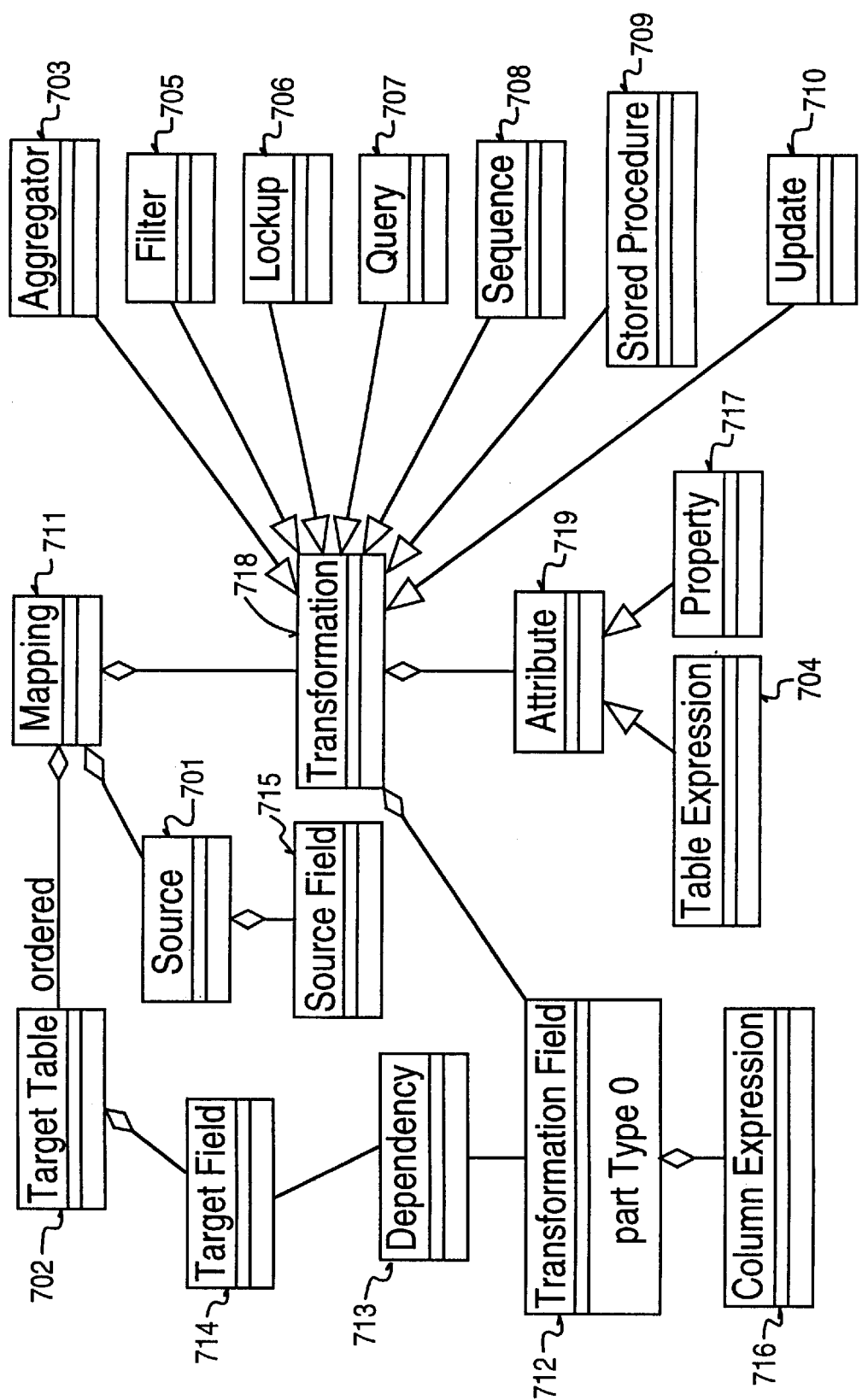
FIG. 7A shows a metadata model for the components of a mapping using the UML notation.

FIG. 7A shows a model for the components of a mapping. The following sections provide a detailed description as well as a specification and an example of using that specification for the fundamental concepts used in TDL. Specification of each object type has two parts: the first part has the declaration for the ports and attributes of the object, and the second part has the definition of the behavior of the object. Source and target objects do not have any behavior. The standard BNF syntax is used for specification of TDL, however for better readability, language keywords are in bold-face with their first letter capitalized while all predefined types and constants are in all capital letters. A variable naming convention, by means of a set of standard prefixes, is also used for quickly identifying the object type associated with a specific variable. For example, the source objects could have sr_as a prefix while the aggregator objects could use the ag_ prefix.

Figure 7B:
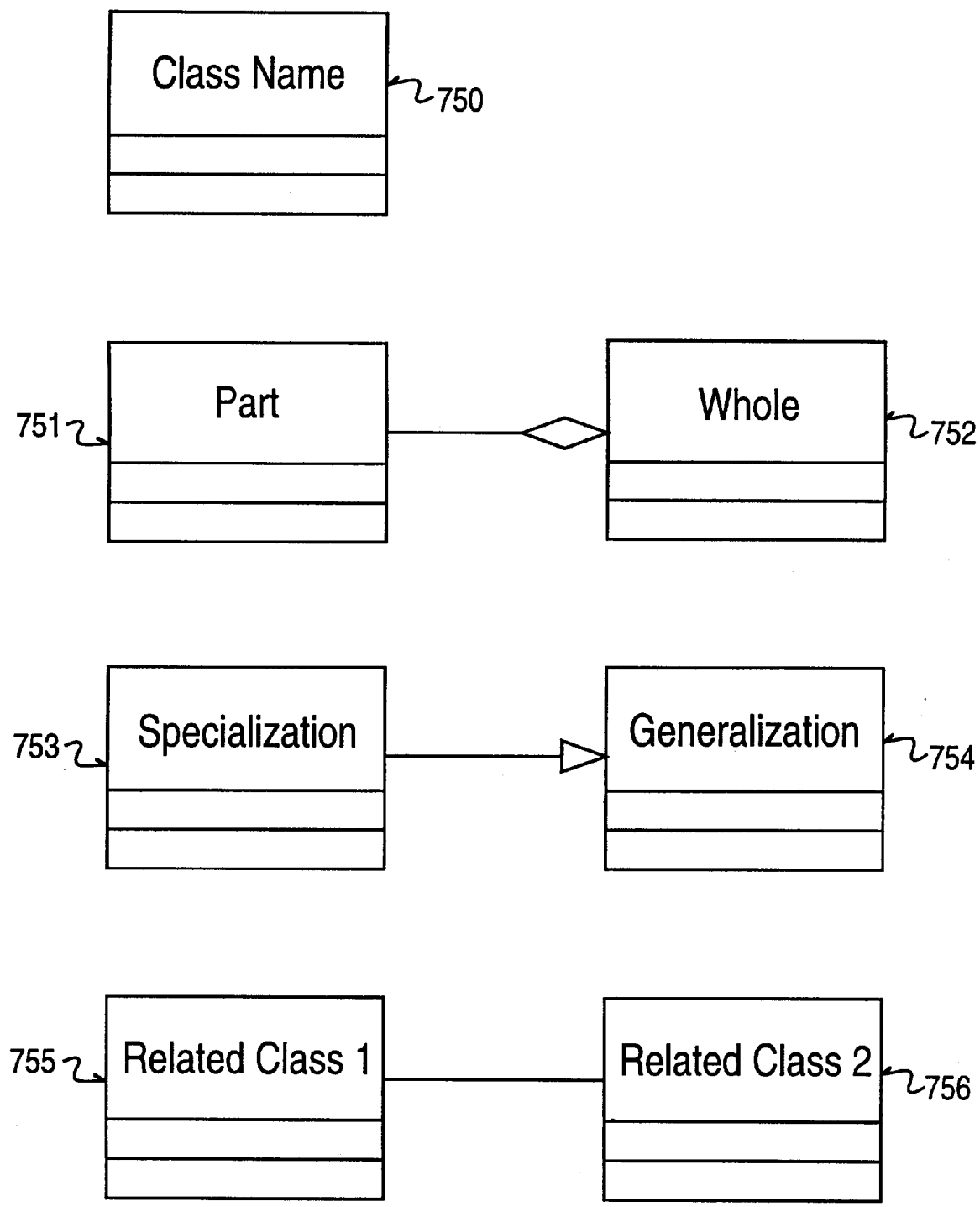
FIG. 7B depicts a UML notation for the components of FIG. 7A.

FIG. 7B depicts a UML notation for the components of FIG. 7A. Basically, a box (e.g., Class Name 750) indicates the abstraction for a concept, such as source, target, etc. A line with a diamond at one end (e.g., the line connecting boxes 751 and 752) indicates an aggregation relationship. A line with an arrow at one end (e.g., the line connecting boxes 753 and 754) indicates a specialization and/or generalization. A simple line (e.g., the line connecting boxes 755 and 756) indicates a general association. Each of the components relating to TDL is now described in detail below.

Port

A port is analogous to a column of a table and provides the primary means of parameterized dataflow between various objects in a mapping. A port must have a name, data type it holds, and its data flow type (i.e., in, out, or in/out). The port may also have precision and scale values for further specifying its data types. A port must always be defined within the definition of a source, target, or transformation object; thus it would be meaningless to have a stand-alone definition of a port. With reference back to FIG. 7A, the Transformation Field 712 corresponds to a port for a transformation object. It may be an input, or output, or an input/output. A ColumnExpression 716 specifies the expression (often defined in SQL) that is used for manipulating the data in the Transformation Field 712. The Dependency 713 captures the dependencies between the source, target, and transformation ports (e.g., the arrows). A TargetField 714 corresponds to the input port of a target table. A SourceField 715 corresponds to the output port of a source.

Specification

<port_def>::=<port$_{13}$ name><data_type_def><port_type>
<port_name>::=<string>
<port_type>::=|IN|OUT|INOUT|
<data_type_def>::=<data_type>[(<precision>[,<scale>])]
<precision>::=<integer>
<scale>::=<integer>

EXAMPLE

Please see examples below

Source

The source object 701 provides purely output information at the beginning of a data-flow pipeline of a mapping, and thus it only has port definitions of type OUT.

```
Specification
CREATE Source <source_name>(
        <ports>
        <ports> ::= <port_def>, . . .
)
Example
CREATE Source sr_lineItem(
        id INTEGER OUT,
        name VARCHAR(20) OUT,
        price MONEY OUT,
        discount MONEY OUT)
```

Target

Target objects 702 are the final receivers of information at the end of a data-flow pipeline for a mapping. All ports of a target object must be of type IN.

```
Specification
CREATE Target <target_name>(
    <ports>
    <ports> ::= <port_def>, . . .
)
Example
CREATE Target tg_storeSum(
    store_id INTEGER IN,
    store_name VARCHAR(20) IN,
    num_orders INTEGER IN,
    avg_sales MONEY IN,
    total_sales MONEY IN)
```

Transformation Objects

As explained above, a number of Transformations 718 are used to transform incoming data according to some pre-defined behavior or rule. There are a number of different types of transformations possible (e.g., Aggregator 703, Filter 705, Lookup 706, Query 707, etc.). Other different types of transformations can be added. Existing transformation types can be modified or even deleted. Furthermore, a transformation object can be customized to perform specific functions, depending on its corresponding application. This allows the reuse of transformation objects across multiple mappings. For example, a lookup transformation may be used in two different mappings, using a different lookup table for each mapping. Each Transformation 718 is comprised of an Attribute Section 719 which defines the characteristics of a transformation specified in its declaration part. This could be covered by either the TableExpression 704 or Property 717. The expressions associated with TableExpression 704 are those expression (often in SQL) that may be used at the table level and not at the port level. Property 717 contains the various characteristics of a transformation, such as a cache directory, etc.

Aggregator Transformation

An aggregator transformation object 703 allows one to perform aggregation functions over one or many of its output or input/output ports. In addition to the port definitions of an aggregator, it also has a Cached attribute for its cache directory location. A default value for this attribute may be optionally specified in the declaration part or later when the aggregator is instantiated. The behavior of the aggregation object is specified in the body of its specification, and one can also optionally specify a set of ports in the Group statement for any group-by behavior. However, the SQL rules for using port names in a group-by statement must be observed.

```
Specification
CREATE Aggregator <aggregator_name>(
    <ports>,
    <ports> ::= <port_def>, . . .
    Cachedir [<string>]ATTR)
\{
    <aggregation_behavior>; . . .
    <aggregation_behavior> ::= <port_name> = <aggregate_exp>
    <aggregate_exp> ::= {<port_name> | <aggregate_func> (aggregator_exp)}
[Group (<port_names>)]
    <port_names> ::= <port_name>, . . .
};
Example
CREATE Aggregator ag_salesStats (
    store_id INTEGER INOUT,
    quantity INTEGER INOUT,
    price MONEY IN,
    discount MONEY IN,
    avg_sales MONEY OUT,
    total_sales MONEY OUT,
    Cachedir STRING ATTR)
{
    avg_sales = AVC(quantity*price - discount);
    total_sales = SUM(quantity*price - discount);
    GROUP(store_id);
};
```

Expression Transformation

The Expression transformation allows the user to associate an expression statement with any of its output or input/output ports. The expression in turn may contain functions that are applied to input or input/output ports.

```
Specification
CREATE Expression <expression_name>(
    <ports>
    <ports> ::= <port_def>, . . .
)
\{
    <expression_binding> ; . . .
    <expression_binding> ::= <port_name> = <expression_exp>
    <expression_exp> ::= {<port_name> | <general_func> (<expression_exp>) |
    <constant>}
```

```
\}
Example
CREATE Expression xp_salesRating(
    quantity INTEGER IN,
    price MONEY IN,
    discount MONEY IN,
    store_rating VARCHAR(10) OUT)
{
  store_rating = IIF(SUM(quantity*price − discount) >= 100000,
  'EXCELLENT', IIF(SUM(quantity*price − discount)<5000, 'POOR','FAIR'));
};
```

Filter Transformation

The filter transformation object 705 applies an expression to all of its ports and outputs all of the ports if the result of the evaluation is TRUE (a non-zero value), otherwise nothing is output. The expression may be a combination of constants and functions applied to the ports.

```
Specification
CREATE Filter <filter_name> (
  <ports>
  <ports> ::= <port_def>, . . .
)
\{
  Filterexpr (<filter_exp>);
  <filter_exp> ::= {<port_name> | <general_func> (<filter exp>) |
<constant>}
\}
Example
CREATE Filter fl_storeFilter(
    store_id INTEGER INOUT,
    store_name VARCHAR(20) INOUT,
    store_yr_opened INTEGER INOUT,
    store_sales MONEY INOUT)
{
  Filterexpr (IIF(store_sales >= 100000 AND store_yr_opened > 1980));
}
```

Lookup Transformation

The lookup transformation object 706 provides the capability to translate one or a combination of ports into other ports based on some predefined fields that are specified in a relational table in the target database. The fields of this lookup table must be specified as lookup ports in the lookup transformation, in addition to a lookup expression and several other parameters.

```
Specification
CREATE Lookup <lookup_name>(
    <ports>,
    <ports> ::= <port_def>, . . .
    Lkpfields (<fields>),
    <fields> ::= <field_def>, . . .
    <field_def> ::= <field_name> <data_type>
    <field_name> ::= <string>
    Lkptable [<table_name>] ATTR,
    [Lkpcaching [<boolean>] ATTR,]
    Multimatch [{FIRST | LAST | ERROR | ALL}] ATTR,
    Dblocation [<string>] ATTR,
    Sourcetype [{DB | FILE}] ATTR,
    [Recache [<boolean>] ATTR]
)
\{
  Lkpoverride <sql_exp>,
  Lkpcond <lookup_expr>,
  <lookup_expr> ::= {<lookup_subexpr> | <lookup_expr>AND
<lookup_subexpr>}
  <lookup_subexpr> ::= <port_name> <logical_op> <port_name>
  <logical_op> ::= { = | <|> | <> | <= | >=}
\}
Example
CREATE Lookup lk_customerLookup (
    old_cust_id INTEGER IN,
```

-continued

```
    cust_id INTEGER OUT,
    cust_name VARCHAR(25) INOUT,
    address VARCHAR(20) OUT,
    city VARCHAR(15) OUT,
    state VARCHAR(2) OUT,
    zip VARCHAR(10) OUT,
    old_cust_id INTEGER) IN,
    Lkpfields (lkp_cust_id INTEGER, cust_id INTEGER, cust_name
        VARCHAR(25), address VARCHAR(20), city VARCHAR(15), state
        VARCHAR(2), zip VARCHAR(10)))
{
    Lkpcond ("OLD_CUST_ID = LKP_CUST_ID");
};
lk_customerLookup ("CUSTADDLKP", TRUE, FIRST, "s:\dw\targcust", DB)
```

Query Transformation

The query transformation object 707 allows one to tailor the input data for a mapping from one or more source objects using SQL expressions. Given the fields of one or more source tables as the input ports of this transformation, the user may either provide a complete SQL query to override the default behavior of the transformation, or specify the join (Select) and filter (Where) parameters of the SQL expression that is created by the system.

```
Specification
CREATE Query <query_name>(
    <ports>
    <ports> ::= <port_def>
)
\{
    [Sqlquery (<sql_exp>);]
    [Userdefjoin (<sql_exp>);]
    [Sourcefilter (<sql_exp>)]
\}
Example
CREATE Query qr_storeQuery(
    store_id INTEGER INOUT,
    store_type CHAR IN,
    store_name VARCHAR(20) INOUT,
    store_address VARCHAR(35) INOUT)
{
    Sourcefilter ("store_type = 'R'")
}
```

Sequence Transformation

The sequence transformation object 708 is used for creating unique keys for records as they are processed in a mapping. Each instance of a sequence transformation is created with an initial value, which is used at the start of an execution, an increment value to compute the values of subsequent indexes, and an end value. Default values will be used if any of these parameters are omitted. This transformation has two predefined output ports, curval and nextval, that contain the current value and the next value of the sequence index, respectively. If the curval is used, all the rows processed will get the same value corresponding to the curval setting at the time of processing; and when the nextval is used, the row for each row is incremented from the curval by the given increment setting. If the Cycle keyword is specified, the sequence numbers will be reused once a cycle has been completed and Reset allows one to reset the value of the index being used to the starting value. The Cache keyword is provided to allow creating blocks of sequence indexes that could be used by one or more other objects.

```
Specification
CREATE Sequence <sequence_name> (
    curval INTEGER OUT,
    nextval INTEGER OUT,
    [Startvalue [<integer>] ATTR,]
    [Increment [<integer>] ATTR,]
    [Endval [<integer>] ATTR,]
    [Cycle [<boolean>] ATTR,]
    [Cache [<boolean>] ATTR,]
    [Reset [<boolean>] ATTR]
)
Example
CREATE Sequence sq_incrBy5Sequence(
    curval INTEGER OUT,
    nextval INTEGER OUT)
{};
sq_incrBy5Sequence (2, 5, 92, TRUE);
```

Stored-Procedure Transformation

The stored-procedure transformation object 709 allows one to execute a parameterized function either in a pipeline mode or stand-alone within the expression, lookup, or user-defined transformations. Furthermore, the stored procedure may return one or more values through its output ports, however, no input/output ports may be used (i.e., the procedure parameters are only passed in by value). Procedures that may have a unique return value may also be specified having their return value represented in a specialized return port. For procedures that are processed on a row-basis, the name of the procedure is specified by the Procname statement. The Targetconn will be used for the location of the database in which the procedures will be executed. In addition to the parameterized procedures discussed, pre- and post-processing functions can be executed before and after the row-by-row transformations are processed. The name of such a function is specified by the Calltext statement and its type is defined one of the four types TARGPRE, TARGPOST, SRCPRE, and SRCPOST. NORMAL is used for the row-by-row type procedures.

```
Specification
CREATE Storedproc <storedproc_name> (
    <ports>
```

-continued

```
  <ports> ::= <port_def>, . . .
  Procname [<string>] ATTR,
  Targetconn [<string>] ATTR,
  Calltype [{TARGPRE | TARGPOST | NORMAL | SRCPRE | SRCPOST}]
ATTR,
  [Calltext [<string>] ATTR]
)
Example
CREATE Storedproc sp_prodDistrProc(
  prodcateg VARCHAR(10) IN,
  price Port MONEY IN,
  salesregion VARCHAR(15) IN,
  numprodsold INTEGER IN,
  futuresales MONEY OUT)
)
{};
sp_prodDistrProc ("forecastSales", "S:\dw\sales", NORMAL);
```

Update Strategy Transformation

With the update strategy transformation object 710, one can specify how each individual row, after it is processed by a mapping, will be used to update the target database tables. The various updating options are insert, delete, update, and override. An expression specified by the user is evaluated for each row to determine the update strategy for that row. This expression returns 0 for insert, 1 for update, 2 for delete, and 3 for reject.

```
Specification
CREATE UpdateStrategy <update_name> (
  <ports>
  <ports> ::= <port_def>, . . .
)
\{
  Updateexpr <update_exp>;
  <update_exp> ::= {<port_name> | <general_func> (<update_exp>) |
<constant>}
\};
Example
CREATE UpdateStrategy us_customerUpdate(
  acct_id NUMERIC(10) INOUT,
  name VARCHAR(25) INOUT,
  address VARCHAR(40) INOUT,
  last_activity DATE IN,
  account_status CHAR INOUT)
{
Updateexpr (IIF(DATE_DIFF(last_activity, SYSDATE,'MM>)>12, 2, 1));
};
```

A mapping 711 is a composition of various source, transformation, and target objects that are linked in a directed, acyclic graph. As shown in FIG. 4, the source and target objects are the starting and ending nodes of the graph, respectively, while the transformation objects provide the intermediate nodes. The description of a mapping presently contains the connectivity data for ports of connected objects. The order that the objects are connected is important since it dictates the data flow in the pipeline from sources to targets. Once a mapping is instantiated, each object in that mapping is included by means of its Exec method.

Functions and Data Types

The functions and data types that are used by TDL is described. The majority of these functions and data types are used in a standard SQL environment, however, additional specific elements are also provided.

```
Specification
<general_func> ::= {<char_func> | <conversion_func> | <date_func> |
<group_func>|
         <numeric_func> | <scientific_func> | <special_func>}
<char_func> ::= {ASCII (<char_var>) |
         CHR (<num_var) |
         CONCAT (<char_var> <char_var>) |
         INITCAP (<char var>) |
         INSTR(<char_var>, <char_var>, [<int_var>, [<int_var>]]) |
         LENGTH (<expr_var>) | LOWER (<expr_var>) |
         LPAD (<expr_var>, <num_var>, [<char_var>]) |
         LTRIM (<expr_var>, [<expr_var>]) |
         RPAD (<char_var>, <num_var>, [<char_var>]) |
         RTRIM (<char var>,[<char_var>]) |
         SUBSTR (<char_var>, <num_var>, [<num_var>]) |
         UPPER (<char_var>) }
<conversion_func> ::= {TO_CHAR ({<num_var>date_var, [<char var>]}) |
         TO_DATE (<char var>, [<char_var>]) |
         TO_NUMBER (<var_char>)}
<date_func> ::= {ADD_TO_DATE (<date_var>, <char_var> <in_var>) |
         DATE_COMPARE (<date_var>, <date_var>) |
         DATE_DIFF (<date_var>, <date_var>, <char_var>) |
         GET_DATE_PART (<date_var> <char_var>) |
         LAST_DAY (<expr_var>) |
         SER_DATE_PART (<date_var>, <char_var>, <int_var>) }
<group_func> ::= {AVG (<num_val>, [<exprval>]) |
         COUNT (<expr_var>, [<expr_val>]) |
         MAX (<expr_var>, [<expr_var>]),
         MEDIAN (<num var>, [<expr_var>]) |
         MIN (<expr_var>, [<expr_var>]),
         PERCENTILE (<num_var>, <num_var>, [<expr_var>]) |
         STDDEV (<num_var>, [<expr_var>]) |
         SUM (<num_var>, [<expr_var>]) |
         VARIANCE (<num_var>, [<expr_var>]) }
<numeric_func> ::= {ABS (<num_var>) |
         CEIL(<num_var>) |
         CUME (<num_var>, [<expr_var>]) |
         EXP (<num_var.>) |
         ABS (<num_var>) |
         FLOOR (<num_var>) |
         ISNULL (<expr_var>) |
         LN (<exp_var>) |
         LOG (<expr_var>, <expr_var>) |
         MOD (<num_var> <num_var>) |
         MOVINGAVG (<num_var>1 <int_var>, [<expr_var>]) |
         MOVINGSUM (<num_var> <int_var>, [<expr_var>]) |
         POWER (<num_var>, <num_var>) |
         ROUND ({<num_var> | <date_var>}, {<num_var> |
         <format_var>}) |
         SIGN (<num_var>) |
         SQRT (<num_var>) |
         TRUNC (<num_var>, [<num_var>) }
<scientific_func> ::= {COS(<num_var>) |
         COSH (<num_var>) |
         SIN (<num_var>) |
         SINH (<num_var>) |
         TAN (<num var>) |
         TANH (<num_var>)}
<special_func> ::= {DECODE (<expr_var>, <expr_var>, <expr_var>,
[<expr_var>]) |
         IIF (<expr_var>, <expr_var>, [<expr._var>]) |
         LOOKUP (<expr_var>, <expr_var>, <expr_var>) |
         PIVOT (<any_var>, <bool_var>) |
         TOP (<num_var>, <int_var>, <int_var>)}
<data_type> ::= {BINARY | BIT | CHAR | DATE | DECIMAL | DOUBLE |
FLOAT
         | IMAGE | INTEGER | MONEY | NUMERIC | RAW | REAL |
         SMALLINT | TEXT | TIMESTAMP | TINYINT | VARCHAR}
     <constant> ::= {<posinteger> | <integer> | <real> | <char> | <string> |
<boolean>}
```

Figure 8:
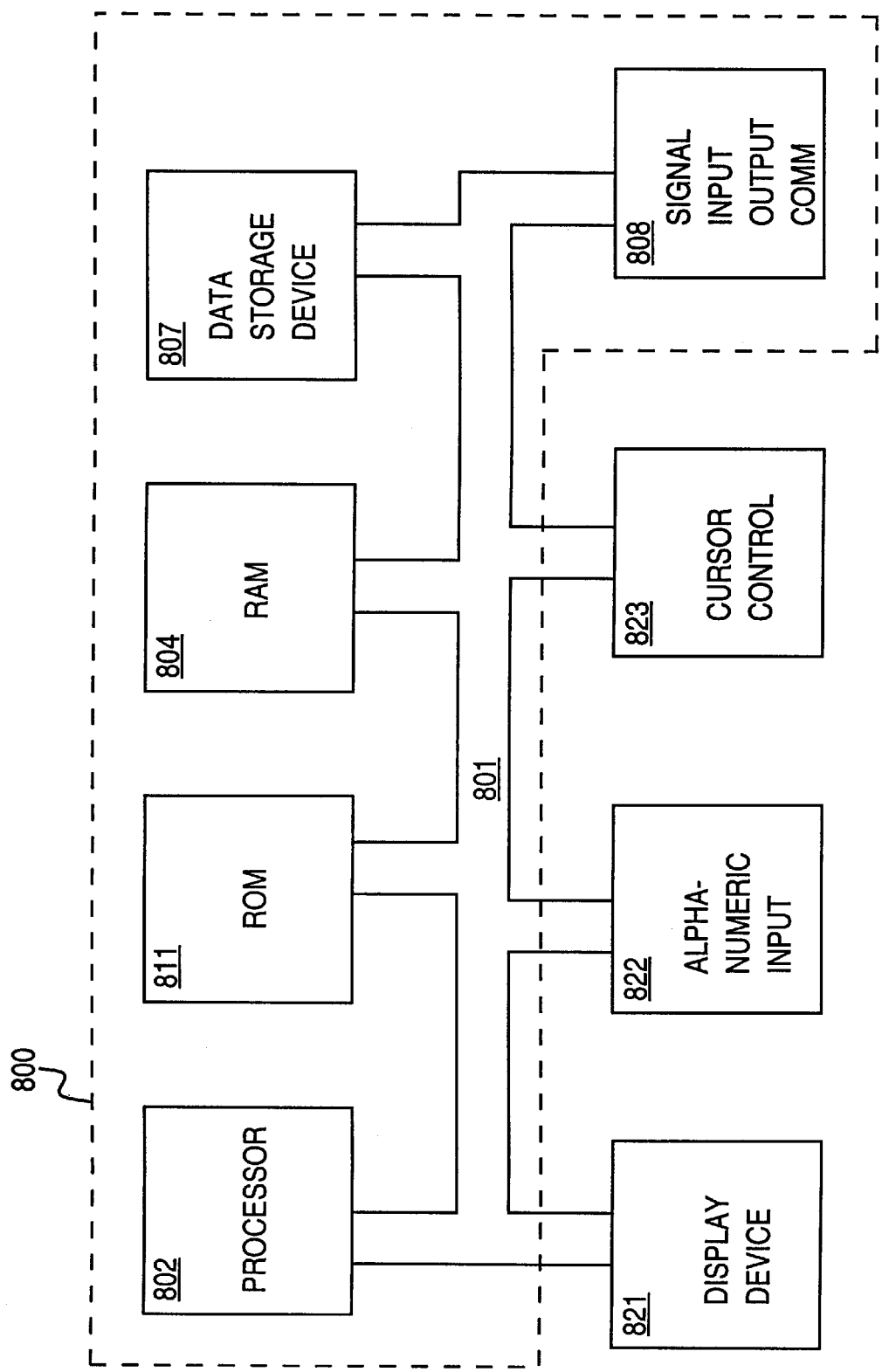
FIG. 8 illustrates an exemplary computer system upon which the present invention may be implemented or practiced.

FIG. 8 illustrates an exemplary computer system 800 upon which the present invention may be implemented or practiced. It is appreciated that the computer system 800 of FIG. 8 is exemplary only and that the present invention can operate within a number of different computer systems. Computer system 800 of FIG. 8 includes an address/data bus 801 for conveying digital information between the various components, a central processor unit (CPU) 802 for processing the digital information and instructions, a main memory 804 comprised of random access memory (RAM) for storing the digital information and instructions, a read only memory (ROM) 811 for storing information and instructions of a more permanent nature. In addition, computer system 800 may also include a data storage device 807

(e.g., a magnetic, optical, floppy, or tape drive) for storing vast amounts of data, and an I/O interface 808 for interfacing with peripheral devices (e.g., computer network, modem, etc.). It should be noted that the client program for performing TDL can be stored either in main memory 804, data storage device 807, or in an external storage device. Devices which may be coupled to computer system 800 include a display device 821 for displaying information to a computer user, an alphanumeric input device 822 (e.g., a keyboard), and a cursor control device 823 (e.g., mouse, trackball, light pen, etc.) for inputting data and selections.

Hence, an apparatus and method for transforming data in data warehousing applications has been disclosed. Furthermore, a functional specification for the Transformation Description Language (TDL) has been described in detail. The primary objective for creating TDL is to provide a text-based representation of the definitions of various source, transformation, and target objects used in data warehousing applications. Such textual descriptions can in turn be used for verification of the mappings created through a graphical user interface. A parser can also be potentially developed for TDL so that components of a mappings described in this language can be brought into other systems. Thus, TDL could potentially become a standard for exchanging transformation metadata across various programs. Furthermore, TDL could potentially be extended to capture the complete behavior of a mapping (i.e., the internal dependencies and the data flow across the acyclic, directed graph structure of the mapping). In a sense, TDL may be extended to become a complete transformation programming language to be used on top of the transformation engine to offer a truly software component which in turn could be embedded in various data warehousing systems. It should also be noted, however, that the specific details of the TDL language (e.g., semantics, keywords, detailed structure of the constructs, etc.), may be enhanced or altered slightly in the course of implementing the language within the scope of the present invention. Furthermore, the concept of a TDL language is intended for describing various types of transformations and how there transformations can be composed in different mappings for data warehousing applications. This TDL language also provides a unique and efficient means for exchanging transformation metadata among various data warehousing applications.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be predefined by the Claims appended hereto and their equivalents.

What is claimed is:

1. A computer implemented method for transforming data in a data warehousing application, comprising the steps of:

specifying at least one source table containing data, wherein the source table includes at least a first source table output port;

storing metadata corresponding to a plurality of transformation objects, wherein the transformation objects have at least one transformation object input port for accepting data and at least one transformation object output port for outputting transformed data and particular transformation objects transform data according to the metadata corresponding to that particular transformation object;

specifying a target table for storing manipulated data, wherein the target table includes at least a first target table input port;

selecting at least one of the transformation objects;

mapping data from the first source table output port to a first transformation object input port of a first selected transformation object, wherein the mapping is defined by a human user;

transforming the data according to the metadata corresponding to the first selected transformation object;

mapping the transformed data from a first transformation object output port to the first target table input port.

2. The computer implemented method of claim 1, further comprising the steps of:

selecting a second transformation object having at least a second transformation object input port for accepting data and at least a second transformation object output port for outputting data, wherein the second selected transformation object manipulates input data according to metadata corresponding to the second selected transformation object;

mapping data from the first source table output port to the second transformation object input port;

mapping transformed data from the second transformation object output port to the first target table input port.

3. The computer implemented method of claim 1, further comprising the steps of:

specifying a second source table containing data, wherein the second source table includes at least a second source table output port;

mapping data from the second source table output port to the first transformation object input port.

4. The computer implemented method of claim 1, further comprising the steps of:

specifying a second target table for storing manipulated data, wherein the second target table includes at least a second target table input port;

mapping the manipulated data from the first transformation object output port to the second target table input port.

5. The computer implemented method of claim 1, wherein the first source table output port, the first transformation object input port, the first transformation object output port, and the first target table input port are comprised of a name, a data type, and a flow type.

6. The computer implemented method of claim 1, wherein the first output port, the first input port, the second output port, the second input port, the third output port, and the third input port are further comprised of a precision value and a scale value.

7. The computer implemented method of claim 1, wherein the first source table output port, the first transformation object input port, the first transformation object output port, and the first target table input port include attributes and specific behavior defining how the first set of data and the second set of data are to be manipulated.

8. The computer implemented method of claim 1, wherein the first transformation object is comprised of an aggregator which performs an aggregation function.

9. The computer implemented method of claim 1, wherein the first transformation object is comprised of an expression which associates an expression statement with either the first input port or the second output port.

10. The computer implemented method of claim 1, wherein the first transformation object is comprised of a filter which applies an expression to either the first input port or the second output port according to an evaluation.

11. The computer implemented method of claim 1, wherein the first transformation object is comprised of a lookup, wherein either the first input port or the second output port is translated into another port based on pre-defined fields that are specified in a relational table in the target database.

12. The computer implemented method of claim 1, wherein the first transformation object is comprised of a query for tailoring input data for mapping from the source table using SQL expressions.

13. The computer implemented method of claim 1, wherein the first transformation object is comprised of a sequence for creating unique keys for records.

14. The computer implemented method of claim 1, wherein the first transformation object is comprised of a stored procedure for executing a parametized function.

15. The computer implemented method of claim 1, wherein the first transformation object is comprised of an update for specifying how rows are used to update the target table.

16. The computer implemented method of claim 1, wherein the behavior corresponding to the first transformation object is different from the behavior corresponding to the second transformation object.

17. The computer implemented method of claim 1 further comprising the step of defining an application specific behavior for the first transformation object and for the second transformation object.

18. A computer implemented method for transforming data in a data mart application, comprising the steps of:
   identifying a set of source tables containing data, wherein each source table has at least one source output port;
   storing a set of transformation objects, wherein each transformation ofject has at least one transformation object input port and at least one transformation object output port and each transformation object has corresponding metadata which defines how data is to be transformed for each of the transformation objects;
   identifying a set of target tables for storing transformed data, wherein the target tables include at least one target table input port;
   selecting one or more source tables, transformation objects, and target tables for constructing a mapping;
   mapping data from one or more selected source table ouput ports to one or more of the transformation object input ports;
   mapping transformed data from one or more selected transformation object output ports to one or more of a different transformation object input port;
   mapping transformed data from one or more selected transformation object output ports to one or more target table input ports.

19. The computer implemented method of claim 18, wherein the ports are comprised of a name, a data file, and a flow type.

20. The computer implemented method of claim 18, wherein one of the transformation objects is comprised of an aggregator which performs an aggregation function.

21. The computer implemented method of claim 18, wherein one of the transformation objects is comprised of an expression which associates an expression statement with either the first input port or the second output port.

22. The computer implemented method of claim 18, wherein one of the transformation objects is comprised of a filter which applies an expression to either the first input port or the second output port according to an evaluation.

23. The computer implemented method of claim 18, wherein one of the transformation objects is comprised of a lookup, wherein either the first input port or the second output port is translated into another port based on redefined fields that are specified in a relational table in the target.

24. The computer implemented method of claim 18, wherein one of the transformation objects is comprised of a query for tailoring input data for mapping from the source table using SQL expressions.

25. The computer implemented method of claim 18, wherein one of the transformation objects is comprised of a sequence for creating unique keys for records.

26. The computer implemented method of claim 18, wherein one of the transformation objects is comprised of a stored procedure for executing a parametized function.

27. The computer implemented method of claim 18, wherein one of the transformation objects is comprised of an update for specifying how rows are used to update the target table.

28. The computer implemented method of claim 18, wherein the behavior corresponding to a first transformation object is different from the behavior corresponding to a second transformation object.

29. The computer implemented method of claim 18 further comprising the step of defining an application specific behavior for a first transformation object in a first application and a different application specific behavior for the first transformation object in a second application.

30. A computer-readable medium having stored thereon instructions for causing a computer to modify data comprising:
   a source for storing untransformed data, wherein the source includes an output port for outputting the untransformed data;
   a plurality of transformation objects for processing the untransformed data according to predefined instructions, wherein the plurality of transformation objects include at least one input port for accepting data and at least one output port for outputting processed data and wherein each of the transformation objects have a predefined set of rules for modifying data;
   a target for storing modified data, wherein the target includes at least one input port for accepting modified data;
   a mapping for directing a flow of data between ports corresponding to the source, one or more transformation objects which were selected from the plurality of transformation objects, and the target.

31. The computer-readable medium of claim 30, wherein a source output port is capable of being mapped to an input port of a first transformation object and an output port of the first transformation object is capable of being mapped to an input port of a first target.

32. The computer-readable medium of claim 31, wherein the source output port is capable of being mapped to an input port of a second transformation object and an output port of the second transformation object is capable of being mapped to the input port of the first target.

33. The computer-readable medium of claim 31, wherein a second source output port of a second source is capable of being mapped to the input port of the first transformation object.

34. The computer-readable medium of claim 31, wherein the output port of the first transformation object is capable of being mapped to an input port of a second target.

35. The computer-readable medium of claim 31, wherein the first transformation object is capable of being mapped to accept inputs from a plurality of source tables or a plurality of previous transformation objects.

36. The computer-readable medium of claim 30, wherein the ports are comprised of a name, a data type, and a flow type.

37. The computer computer-readable medium of claim 36, wherein the ports are further comprised of a precision value and a scale value.

38. The computer-readable medium of claim 30, wherein the transformation objects include attributes and specific behavior defining how the data is to be manipulated.

39. The computer-readable medium of claim 30, wherein the plurality of transformation objects are comprised of one or more of the following: an aggregator transformation, an expression transformation, a filter transformation, a lookup transformation, a query transformation, a sequence transformation, a stored procedure transformation, and an update strategy transformation.

40. The computer-readable medium of claim 30, wherein the aggregator transformation performs aggregation functions over one or more ports associated with the aggregator transformation and contains an attribute specifying an associated cache directory location.

41. The computer-readable medium of claim 30, wherein the filter transformation applies an expression to all associated ports if a result of an evaluation is true.

42. The computer-readable medium of claim 30, wherein the lookup transformation translates or a combination of associated ports into other ports based on predefined field.

43. The computer-readable medium of claim 30, wherein the query transformation modifies input data for a mapping from one or more sources using SQL expressions.

44. The computer-readable medium of claim 30, wherein the sequence transformation creates unique keys for records as the records are processed in a mapping.

45. The computer-readable medium of claim 44, wherein each instance of the sequence transformation is created with an initial value which is used at the start of an execution, an increment value to compute values of subsequent indexes, and an end value.

46. The computer-readable medium of claim 45, wherein the sequence transformation further includes two redefined output ports that contain the current value and a next value of a sequence index.

47. The computer-readable medium of claim 30, wherein the stored procedure transformation executes a parameterized function either in a pipeline mode or a stand-alone mode within the expression, lookup, or user-defined transformations.

48. The computer-readable medium of claim 30, wherein the update strategy transformation specifies how each individual row, after the row is processed by a mapping, is used to update the target.

49. The computer-readable medium of claim 48, wherein the update includes insert, delete, and override functions.

50. The computer-readable medium of claim 30, wherein the mapping is comprised of a combination of source, transformation, and target objects that are linked corresponding to a directed, acyclic graph.

51. The computer-readable medium of claim 50, wherein the mapping is further comprised of connectivity data for ports of connected objects and an order that the objects are connected.

* * * * *